Patented Aug. 31, 1937

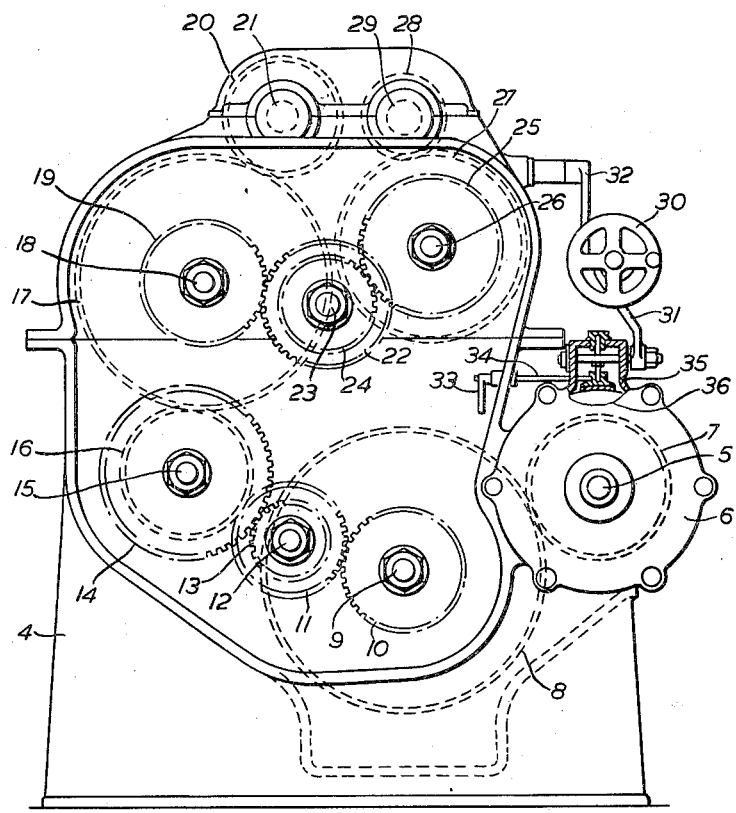

2,091,320

UNITED STATES PATENT OFFICE 2,091,320

CHANGE SPEED GEARING

Edward Kinsella, Charles Wesley Addy, and John Gordon Pratt, Spondon, near Derby, England, assignors to Celanese Corporation of America, a corporation of Delaware Application August 3, 1935, Serial No. 34,564
In Great Britain August 30, 1934

1 Claim. (Cl. 74—421)

This invention relates to change speed gearing, and in particular to toothed gear mechanism adapted to be interposed between a driving member and a driven member, and capable of providing for transmission of power at different speed ratios.

According to the invention, the toothed gear mechanism comprises at least two pairs of intermeshing gears arranged in series, the gears of each pair being mounted on centres at a fixed distance apart, and the gears in each pair being replaceable by other pairs of toothed gears, one pair of gears being connected to driving means and the other pair to driven means. The speed ratio between the driving means and the driven means is a function of the product of the speed ratios of the two pairs of toothed gears. In accordance with the invention, the speed ratios of the two pairs of gears are also capable of varying by steps which are different in the case of one pair from those of the other. The compounding of the two speed ratios thus gives a speed ratio between the driving means and the driven means capable of varying by a large number of stages between the maximum and the minimum obtainable by the products of the greatest and smallest ratios respectively of the two pairs of gears. The larger the number of teeth in each pair of gears, the greater is the number of different speed ratios possible.

Apart from the possibility of obtaining a large number of speed ratios, the toothed gear mechanism according to the invention has the advantage that the replaceable gears of each pair, being on fixed centres, can always be correctly meshed, the gears selected for each pair being complements one of the other to span the distance between their centres, so that whatever the power to be transmitted there is no danger of wheel or tooth breakage by reason of teeth meshing not sufficiently far or meshing too deeply.

In order to obtain the different steps by which the speed ratios of the two toothed wheel train pairs may vary, the distance between the pairs of fixed centres of the one pair of wheels may differ from that between the fixed centres of the other pair of wheels. Alternatively or in addition the pitch of the teeth of one pair of wheels may differ from that of the other. Conveniently, the fixed centre of the driven member of the first pair of wheels is the centre for the driving member of the second pair of wheels, so that in a mechanism employing two pairs of wheels in series, which arrangement generally suffices to provide for a large number of gradual changes in speed ratio, only three fixed centres are needed for the four replaceable wheels.

By way of example a gear box constructed in accordance with the invention will now be described in greater detail with reference to the accompanying drawing, which shows the gear box with one of its side plates removed.

The gear box comprises a casing 4 containing the gears. The driving shaft 5 is connected by means of a clutch enclosed in the clutch casing 6 to a gear 7 shown in dotted lines. The gear 7 engages with a gear 8 which is mounted upon a shaft 9, and from the shaft 9 the drive is transmitted through gears 10, 11 to a shaft 12 and thence by gears 13, 14 to a shaft 15. Each of the shafts 9, 12, 15 is fixed while the four gears 10, 11, 13, 14 are removable and are interchangeable with other sets of gears. The steps, however, by which the gear ratios of the gears which may be substituted for 10 and 11 vary are different from the steps between the gear ratios of the gears to be substituted for 13, 14. By this means, as is explained below, a very large number of different speed ratios between the shafts 9 and 15 are available. The shaft 15 carries a gear 16 which engages the gear 17 on a further shaft 18. The gear 17 also engages with a gear 20 mounted on a driven shaft 21. The gears 7, 8, 17, and 20 are fixed gears which are not adapted to be changed, so that the speed ratio between the driving shaft 5 and the driven shaft 21 is adjusted merely by changing the two pairs of gears 10, 11, 13, 14. The shaft 18 carries a removable gear 19 adapted to engage with a gear 22 on a fixed shaft 23. The shaft 23 also carries a gear 24 engaging with a gear 25 on a shaft 26. The shaft 26 also carries a fixed gear 27 engaging a gear 28 mounted on a second driven shaft 29. The gears 19, 22, 24, 25 are exchangeable with other gears and as with gears 10, 11, 13, 14 the steps by which the gear ratios vary are different in the case of the gears 19, 22 from those of the gears 24, 25. The speed ratio between the driving shaft 5 and the driven shaft 29 depends upon the gear ratios of the exchangeable gears 10, 11, 13, 14, 19, 22, 24, and 25. To regard the matter from another point of view, the speed ratio between the two driven shafts 21, 29 depends upon the gear ratios of the exchangeable gears 19, 22, 24, 25.

The gear box described and shown is provided with means for mounting alternative gear trains, as described in U. S. application S. No. 35,266 filed August 8, 1935. The gear case 4 in the gear box is divided into three parts by means of two partitions parallel to the plane of the paper, and the exchangeable gears 10, 11, 13, 14, 19, 22, 24, and 25 are contained in the nearest part. In the middle part are contained the fixed gears 7, 8, 16, 17, 20, 27, and 28. In the furthest part of the gear box are contained further exchangeable gears similar to those shown, and such further exchangeable gears are adapted to be employed alternately with the gears shown. Thus when a change of gear is required the requisite exchangeable gears are placed in position in that part of the gear box which is not in use and then the drive is transferred from the exchangeable gears in use to the exchangeable gears which have just been placed in position. This change of drive is effected by means of the clutch 6 which is operated by means of a handle 30. The clutch is so disposed as to transfer the connection between the driven shaft 5 and the gear 7 to another gear similar to the gear 7 but connected to the other side of the gear box.

Each of the driven shafts 21, 29 is provided with a free wheel gear so that as the clutch 6 operates the faster set of exchangeable gears may be in operation while the other set is inoperative. When the change has been effected the free wheel mechanisms are put out of action by means of a lever 32 connected to the wheel 30. In order to prevent the gears in the idle half of the gear box from rotating while the exchangeable gears are being changed, a brake 35 is provided acting on a brake drum 36 connected to the gear 7 and operated by a lever 33 through a rod 34. The lever 33 is so disposed that it rises when the cover plate of the gear box is removed (as shown in the drawing) so that when the cover plate is removed for changing the gears the brake 36 is applied and the exposed shafts are brought to rest. When the cover plate is replaced, the lever 33 is pressed down and the brake 36 is lifted, leaving the gears free to rotate.

Each of the pairs of interchangeable gears 10, 11; 13, 14; 19, 22; and 24, 25; is mounted on two fixed centres (9, 12; 12, 15; 18, 23; 23, 26) at a distinct distance apart and, in connection with each pair of centres, a set of gears is provided forming a number of pairs of gears interchangeable with the pair in use. In view of the constancy of distance between the fixed centres the sum of the pitch circles of any pair of gears is constant throughout the set to which it belongs. In ordinary gear cutting practice this means that the total number of teeth is the same for each pair of gears, and adjacent pairs of gears in the gear ratio series differ in respect of both gears, one gear being increased by one tooth while the other is decreased by one tooth. Thus, if a series of gears is provided, ranging from 30 teeth to 70 teeth, the total number of teeth in any pair of gears is always 100, and the pair of gears adjacent to the pair 35, 65, say, is 36, 64.

According to a practice in the gear cutting art, however, it is possible to cut gears from the same sized blanks as standard gears, and with the same pitch circles, but having one tooth more or less than the corresponding standard gears. By means of these gears it is possible to obtain intermediate ratios in the gear ratio series in which the adjacent pairs of gears may differ in respect of one gear only. Thus by the use of an auxiliary gear of the kind referred to, one gear may be increased by one tooth without the necessity of decreasing the other gear by one tooth. For example, a standard pair of gears having 35 and 65 teeth respectively could be replaced by a standard gear of 65 teeth, and a gear cut from the same blank as a standard 35 tooth gear, but having 36 teeth. In order to obtain a full range of ratios it is only necessary to provide auxiliary gears (one with one tooth more and one with one tooth less than a standard gear) in connection with half of the standard gears, preferably with the smaller gears for economy in material and labour. That is, the standard set of gears referred to above, each pair of which has 100 teeth, could be augmented with 20 auxiliary gears cut from standard 30-49 tooth blanks but having 29-48 teeth, and 20 auxiliary gears cut from similar blanks and having 31-50 teeth. These auxiliary gears being provided, each of the other standard gears, for which no auxiliaries are provided, can mesh with the complementary standard gear, or with either of the auxiliary gears cut from blanks of the same size and having the same pitch circle as such complementary standard gear. Thus, the standard 65 tooth gear can mesh with the standard 35, or with an auxiliary 34 tooth gear, or an auxiliary 36 tooth gear.

For the purpose of the present invention two pairs of gears are employed at any time to give a definite speed ratio, e. g. the pairs of gears 10, 11; 13, 14. In connection with each of these two pairs a set of standard gears is provided and a set of auxiliary gears corresponding to said standard gears. The gear ratios obtainable from the set of gears interchangeable with the gears 10 and 11 is a different range from that obtainable by set of gears 13, 14, and as a result the total number of different gear ratios obtainable between the driving shaft 9 and the driven shaft 21 is very great. The number of total ratios obtainable is substantially equal to the product of the number of ratios obtainable in the two sets of gears, there being very few ratios which can be obtained in two or more different ways. It should be observed that the object of the invention is not to obtain a series of gear ratios in regular sequence, as is required for example in the screw cutting art, but to obtain a very large number of ratios disposed more or less at random within a given range and so numerous that a ratio may be selected closely approximating to any desired ratio whatever within the range. Thus, one set of gears may range from 30-70 teeth as above, giving a range of 41 ratios from 30/70 to 70/30, and the other set may range from 30-80, giving a range of 51 ratios from 30/80 to 80/30 on standard gears alone. The total number of combinations available with standard gears only is 2,091, but with auxiliary gears as described above, the number is increased to approximately 18,820. Since few of these combinations give the same gear ratio as others, there are about 18,000 different ratios within the ratio range 9/56 to 56/9. The greater the length of the gear series, the greater the number of ratios and the less the possible error.

What we claim and desire to secure by Letters Patent is:—

A toothed gear apparatus comprising at least two pairs of fixed centres, the centres of each pair being at a fixed distance apart and the pairs of centres being adapted to receive pairs of intermeshing gears which constitute a train of gears giving a compound gear ratio equal to the product of the gear ratios of the pairs of gears, and a set of gears comprising a number of standard gears whose pitch circles are proportional to the number of teeth therein and a number of gears each having the same pitch circle as one of said standard gears but having one tooth more or less than said standard gear, said pairs of gears being selected from said set of gears, said set of gears providing a series of pairs of gears for each of said pairs of centres, the gear ratios of the different series being different so that a very large number of trains of gears having different compound gear ratios may be selected for use on said centres.

EDWARD KINSELLA.
CHARLES WESLEY ADDY.
JOHN GORDON PRATT.